United States Patent [19]
Goulas

[11] 3,831,259
[45] Aug. 27, 1974

[54] A METHOD OF PROVIDING A SOLID GALL PREVENTER IN A PIN AND BOX JOINT

[75] Inventor: Bobbie D. Goulas, Lafayette, La.
[73] Assignee: BG & F Inc., Lafayette, La.
[22] Filed: Apr. 13, 1972
[21] Appl. No.: 243,774

[52] U.S. Cl............... 29/428, 277/DIG. 6, 277/165, 277/201, 285/332.3
[51] Int. Cl............................................. B23p 19/00
[58] Field of Search.................... 29/458, 427, 428; 277/DIG. 6, 201, 1, 165; 285/332.2, 332.3, 333, 334

[56] References Cited
UNITED STATES PATENTS
| | | | |
|---|---|---|---|
| 2,147,254 | 2/1939 | Hinderliter | 285/332.2 |
| 2,980,451 | 4/1961 | Taylor et al. | 285/332.3 |
| 3,499,670 | 3/1970 | DeWoody | 285/390 X |

FOREIGN PATENTS OR APPLICATIONS
| | | | |
|---|---|---|---|
| 575,620 | 2/1946 | Great Britain | 277/DIG. 6 |

Primary Examiner—Charlie T. Moon
Attorney, Agent, or Firm—Pugh & Laiche

[57] ABSTRACT

A solid thin hydrocarbon plastic gasket, preferably of polytetrafluoroethylene ("Teflon"), in the form of a round thin ring of approximately one-thirty-seconds inch (1/32 inch) thickness and a predetermined diameter acting as a gall preventor for pin and box connections of tool joints primarily used in rotary oil well drilling. The thin ring has an inner and outer diameter (before it is compressed) which coincides (± 1/32 of an inch) with the outer and exterior diameters of the particular pin joint on which it is used.

Initially the pin and box joint is "broken out" (if not already separated) and the Teflon ring is placed upon the surface of the pin's face. The pin connection is then engaged with the box connection and screwed together or "made up". As pin and box joint are screwed together the faces of the two connections will compress the thin ring forcing some of the material into the counter bore of the box connection while simultaneously some of the material is forced from the faces to extend on the outside of both connections. A solid, thin, gall preventing film of approximately two-thousandths of an inch (2/1000 inch) thickness remains between the faces, thereby protecting the tool joint faces from the deleterious effects of galling while permitting them to seal properly.

3 Claims, 4 Drawing Figures

PATENTED AUG 27 1974

3,831,259

A METHOD OF PROVIDING A SOLID GALL PREVENTER IN A PIN AND BOX JOINT

BACKGROUND OF THE INVENTION

The present invention relates to an improved solid, gall-preventing ring or gasket, and method of application, for tool joint connections in oil well drilling applications.

Rotary shoulder connections are the most popular connections used on drill collars, drill pipe and other sections of the drill stem used in oil well drilling. The design of these connections is basically simple. There are two threaded members called the "box" and the "pin". On both connections there is a flat machined surface called the "face".

The face is the most important part of the connection since it is primarily here that the seal between sections is formed. The importance of a proper seal can be more fully appreciated if it is understood that the fluids are handled under extremely high pressures in rotary drilling for oil and gas. For example, an improperly sealed pin and box connection can result in a "wash out" which can cause the drill string to be literally cut in two thereby resulting in costly and dangerous "fishing" operation to restore drilling operations.

It is common practice in the oil industry today for "rough necks" to apply lubricant or "dope" to the threaded section of the connection prior to its being "made-up" or screwed together. Even under optimum conditions, however, these dope lubricants are usually ineffective in preventing "galling" of the mating surfaces, particularly at the faces, during "make-up of the joint. Likewise under optimum conditions, this lubrication is intended to facilitate later "break-out" of the threaded connection. This make-up and break-out procedure is a frequent and normal operation in rotary oil well joint.

There are several distinct disadvantages in the use of a dope type of lubricant in the make-up and break-out procedure discussed above. In order for the dope type of lubricant to work effectively, the precise amount of uncontaminated dope must be applied at each joint or of threaded connection. Similarly, it is apparent that improper care of threaded joints can do nothing but decrease their effectiveness in use and result in costly corrective measures. Evidence of poor lubrication control are found repeatedly in the oil industry where "washout" of tool joints, tubing and casing leaks, corrosion of threads, and especially galling occur with undesirable frequency.

Factors contributing to failure of threaded connections vary but a major contributing factor is the improper application of dope type of lubricant. To better understand how this dope type of lubricant is used, a typical operation is described. In practice, there is a "dope bucket" on the derrick floor of every rig. There are practical reasons why this dope lubricant is not applied under optimum conditions. For example, on rigs there is a constant contamination of the lubricant from drilling mud, debris, and water because the dope bucket remains uncovered in most instances from the time it is first opened. In the field dirt and dust and long exposure to air or the contamininants are the reasons that discuss the characteristics change for the worse. This results in the delimiting of the ability of the lubricant to do its job even if the dope lubricant were otherwise properly applied.

Furthermore, in each of the dope buckets there is a "dope stick" or brush. Often this is a stick with some waste material or a rag wrapped around the application end. As the individual pin and box connection is made-up or brokeout, the rough neck applies the dope lubricant with the crudely fashioned dope stick in an effort to lubricate the joint. There is, however, no uniformity in the amount of lubricant deposited each time and, hence, there is, in practice, no way to get uniform and effective distribution of the dope lubricant on the thread. Frequently the importance of correct lubrication is not known to the rough neck doing the doping job and many times he lacks the time to do so since speed is regarded as the more important goal in the make-up and break-out operations used in the rotary drilling of oil and gas wells.

Hence the use of dope lubricants has been found to be ineffective in the prevention of damage due to galling. A recognition of this problem is discussed in U.S. Pat. No. 2,924,876 to James E. Lewis. Basically, galling is the result of poor lubrication on the faces of the pin and box connections.

Galling may be described in the following manner. As two properly made-up connections are being used in drilling, the tension and compression factor works against them such that the constant pressure on the faces of these connections during the compression stage may result in tiny high spots or thin metal slivers being formed on the faces opposite one another. The dope lubricant that was placed on the faces is slowly removed from between these high spots and once the lubricant is removed, these high spots are dry. The heat caused from the friction of metal-to-metal contact causes these tiny high spots to weld together and at the time these two connections are broke-out, the welds have to be torn apart. Consequently, when these welds are torn apart galling is induced. From the foregoing it can readily be seen that the use of liquid or dope type of lubricant is unsatisfactory to prevent galling resulting in improper sealing of the box and pin connection in a typical rotary drilling application.

Mechanical "solutions" to the problem of galling in rotary drill connections are discussed in U.S. Pat. Nos. 2,091,906 and 2,772,899 issued to Bettes and Evans, respectively. These solutions require special machining of the faces of the tool joints and have been found to be unsatisfactory in modern-day oil well drilling techniques. A major objection of these techniques is that they require initially more expensive manufacturing procedures as well as the factors of expense and time in maintaining the specially machined faces on the pin and box connections.

The present invention is directed to a solid, antigalling lubricant ring for a tool joint and its method of use. The solid lubricant ring is made of plastic, preferably polytetrafluoroethylene (Teflon), of approximately 1/32 of an inch thickness having an inner and outer diameter and shape depending on the pin and box connection size and shape.

Teflon is a tough waxy solid, white to gray in color, is characterized by its chemical inertness and is highly resistant to abrasion. Teflon and its chemical characteristics are more fully described in U.S. Pat. No. 2,230,654 to Plunkett, and the process of fabrication of gaskets of Teflon is described in U.S. Pat. No. 2,456,262 to Fields.

The ring of the present invention does not form the seal between the faces of the rotary shoulder connections, and only the faces themselves form the vital seal as explicitly specified by the American Petroleum Institute. This is a very important distinction in considering the present invention, and the instant anti-galling ring should not be confused with the standard sealing gaskets, some of Teflon, used with tool joints, as for example those described in the U.S. Pat. Nos. to Hinderliter (2,147,254), Taylor et al. (2,980,451) and Hardy et al. (3,054,628).

Teflon is, it is true, very well known as a sealing agent. However, the solid, anti-galling lubricant ring of the present invention is not used in such a way as to form a seal therewith. To the contrary, when the solid, anti-galling lubricant ring is placed between the pin and box connection and the pin and box connection is then tightened in the normal mode of operation in a typical drilling procedure, the ring becomes somewhat porous and then has only a thickness of approximately 2/1000 of an inch. This thin filmed, solid anti-galling layer acts as an excellent lubricant which enhances the sealing characteristics of the shouldered connections themselves but does not itself form a seal.

After the connection is made of the pin and box joint under the proper torque, the solid, anti-galling ring of the present invention remains in a solid state. When the compression stage forms the tiny high spots on the faces, the thin gasket is compressed between these high spots. Because of the elasticity of the hydrocarbon plastic used, these tiny high spots only compress and spread, but do not displace the thin film ring. Since the ring remains between these high spots until break-out, welding cannot be induced and galling is eliminated.

Teflon, after being compressed, has a tendency to contract when released from the compression. When the section of the face is in the tension stage and the face is separated slightly, the Teflon contracts, thus drawing itself within the faces. As this section goes into compression, the Teflon is compressed again but not squirted out, as would a liquid lubricant, and thereby remains intact and in a solid form until breakout, thereby preventing galling.

It is therefore the object of the present invention to provide a solid lubricant ring suitable for use with pin and box connections in rotary oil well drilling.

Another object of the invention is to provide a solid, thin filmed gall preventer suitable for use in pipe connections in rotary oil well drilling applications which substantially eliminates galling.

Yet another object of the invention is to provide a solid, thin filmed gall preventer which is simple and inexpensive to use while offering optimum protection against galling resulting in the make-up and break-out of joint connections in rotary oil well drilling.

Still another object of the invention is to provide a solid, thin filmed gall preventer which enhances the sealing characteristics of the faces on the pin and box connection joints in rotary oil well drilling.

These, together with other objects and advantages of the present invention, will become apparent as more fully hereinafter described and claimed, reference being made now to the accompanying drawings wherein like reference numbers refer to like parts.

DESCRIPTION OF THE PREFERRED EMBODIMENT

Figure 1:
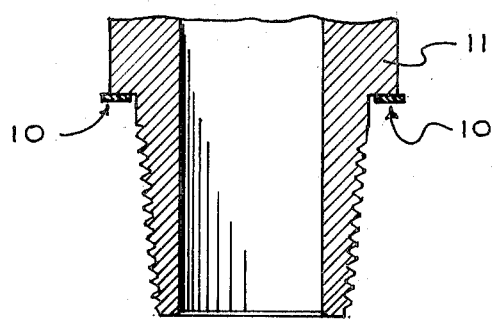
FIG. 1 is a cross-sectional view showing a typical pin and box connection between pipe sections "broken out", the pin having the solid, gall preventing ring of the present invention placed on it.
Figure 1:
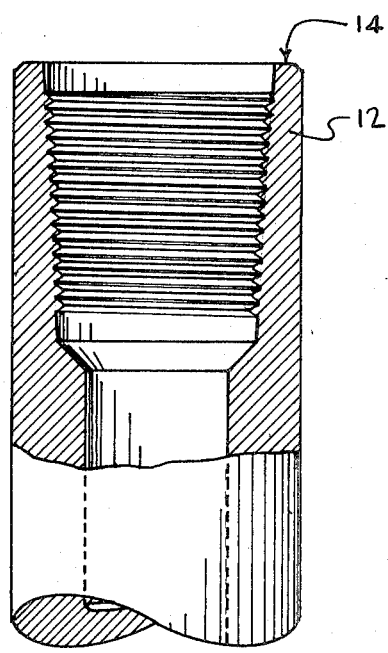
Figure 2:
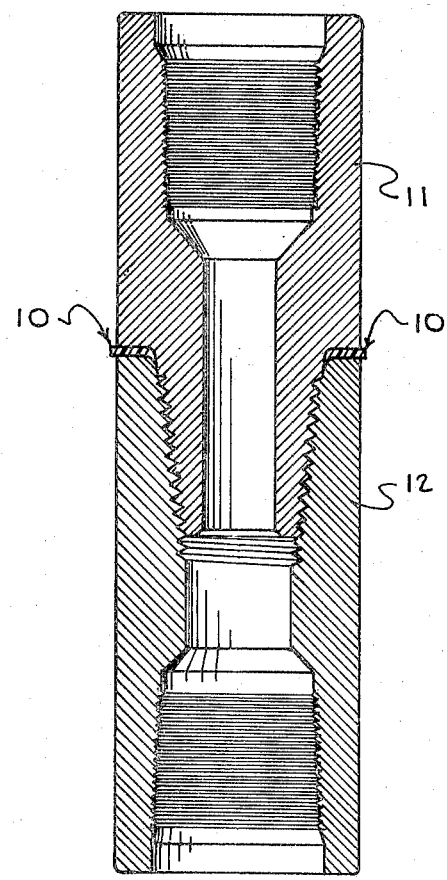
FIG. 2 shows the same type of pin and box connection of FIG. 1 but on "sub" elements, the elements being screwed together in a made-up condition.

Referring now to the drawings, a typical pin 11 is illustrated in a broken-out position with respect to the box joint 12. While the pin and box joint are in this broken-out position, the thin, solid gall preventing ring 10 is placed on the face of pin 11.

The ring 10 acts as a solid gall preventer during and after the pin 11 and box 12 are made-up. While the pin and box joint are made-up under proper torque, the ring 10 is compressed from a thickness of approximately one-thirty-secondth of an inch (1/32 inch) to a thin film having a thickness of approximately two-thousandths of an inch (2/1000 inch). In this compressed position the thin filmed, solid gall preventing ring 10 becomes porous. In this porous condition it does not act as a seal for the pin and box joint, although it does enhance the seal formed by the faces of the pin and box joint which themselves form the proper seal for the rotary connection joint.

The ring 10 is made from a plastic material which may be one of the following, although not limited thereto: polytetrafluoroethylene Teflon; polyethylene terephthalate "Mylar"; polyethylene; polyamide "nylon"; polychlorotrifluoroethylene "Trithene"; polyvinyl chloride "Velon"; vinylidene chloride-vinyl chloride copolymer "Saran"; polystyrene "Styroflex"; vinyl-nitrile rubber "Visten".

The outer diameter of the ring 10 will depend on the pin and box joint connection outer diameters, although it is to be understood that the thickness before compression is approximately one-thirty-seconds of an inch (1/32 inch) which is reduced under compression to a thin porous film of approximately two-one-thousandths of an inch (2/1000 inch).

Figure 4:
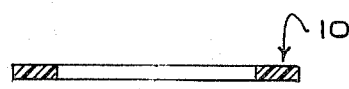
FIG. 4 is a side, cross-sectional view of the ring of FIG. 3 along section lines 4—4.
Figure 3:
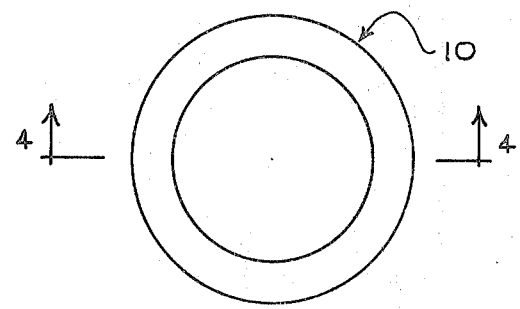
FIG. 3 is a top plan view of the solid, gall preventing ring of the present invention.

The inner diameter of the ring 10 coincides substantially with the outer diameter of the pin joint 11 (±1/32 inch) but can be made slightly smaller so that once the ring 10 is placed in position next to the face of the pin 11 it adheres to it or grasps it under compression. (For clarity, illustrative purposes, FIG. 1 shows a gap between the ring 10 and the outer diameter of the pin element 11, but in the preferred practice there is no substantial gap.) Furthermore the shape of the inner periphery of the ring 10 should conform substantially to the periphery of the portion of the pin between its face and the upper threaded section. In the embodiment shown in FIG. 4, the inner diameter of the ring is shown to be circular but could take on other configurations depending on the outer peripheral shape of the pin joint.

In an actual application of the ring 10, a rough-neck quickly places the ring around the pin 11 against its face and inserts the pin into the box 12. The pin 11 is then tightened to the right amount under proper torque such that the shoulder 14 engages the face of the pin 11 resulting in compression of the ring 10. Under compression the pin and box connections will compress the thin ring forcing some of the material into the counter bore of the box connection while simultaneously forcing some of the material from the faces to extend on the outside of both connections. It is in this manner that the thin filmed, solid gall preventing ring 10 acts to provide the faces with proper protection so as to prevent galling while permitting the joints to seal properly as they are designed to.

Because many varying and different embodiments may be made within the scope of the inventive concept herein taught, and because many modifications may be made in the embodiment herein detailed in accordance with the descriptive requirements of the law, it is to be understood that the details herein are to be interpreted as illustrative and not in a limiting sense.

What is claimed as invention is:

1. A method of providing a solid gall preventer for the faces of a pin and box joint comprising the steps of:

placing a solid thin ring of approximately one-thirty-seconds of an inch (1/32 inch) thickness over the face of a broke-out pin connection;

inserting the ring-mounted pin connection into the box joint; and making-up the pin and box connection using a predetermined amount of torque such that the solid thin ring is compressed to a thickness of approximately two-thousandths of an inch (2/1000 inch), said compressed ring having become porous such that it acts to enhance the natural sealing characteristics of the pin and box joint at their shoulders while simultaneously the ring acts as a solid lubricant both while the pin and box are being made up and when they are broke out, such that galling is reduced to a minimum.

2. The method of claim 1 wherein:

the ring has an inner diametric periphery conforming substantially to the diametric periphery of the pin joint but being slightly smaller such that the ring has a tendency to adhere to the pin joint at its shoulder once placed in position.

3. The method of claim 2 wherein:

the ring is formed of a plastic material from the group consisting of: polytetrafluoroethylene, polyethylene terephthalate, polyethylene, polyamide, polychlorotrifluoroethylene, polyvinyl chloride, vinylidene chloride-vinyl chloride copolymer, polystyrene and vinyl-nitrile rubber.

* * * * *